Patented Feb. 6, 1940

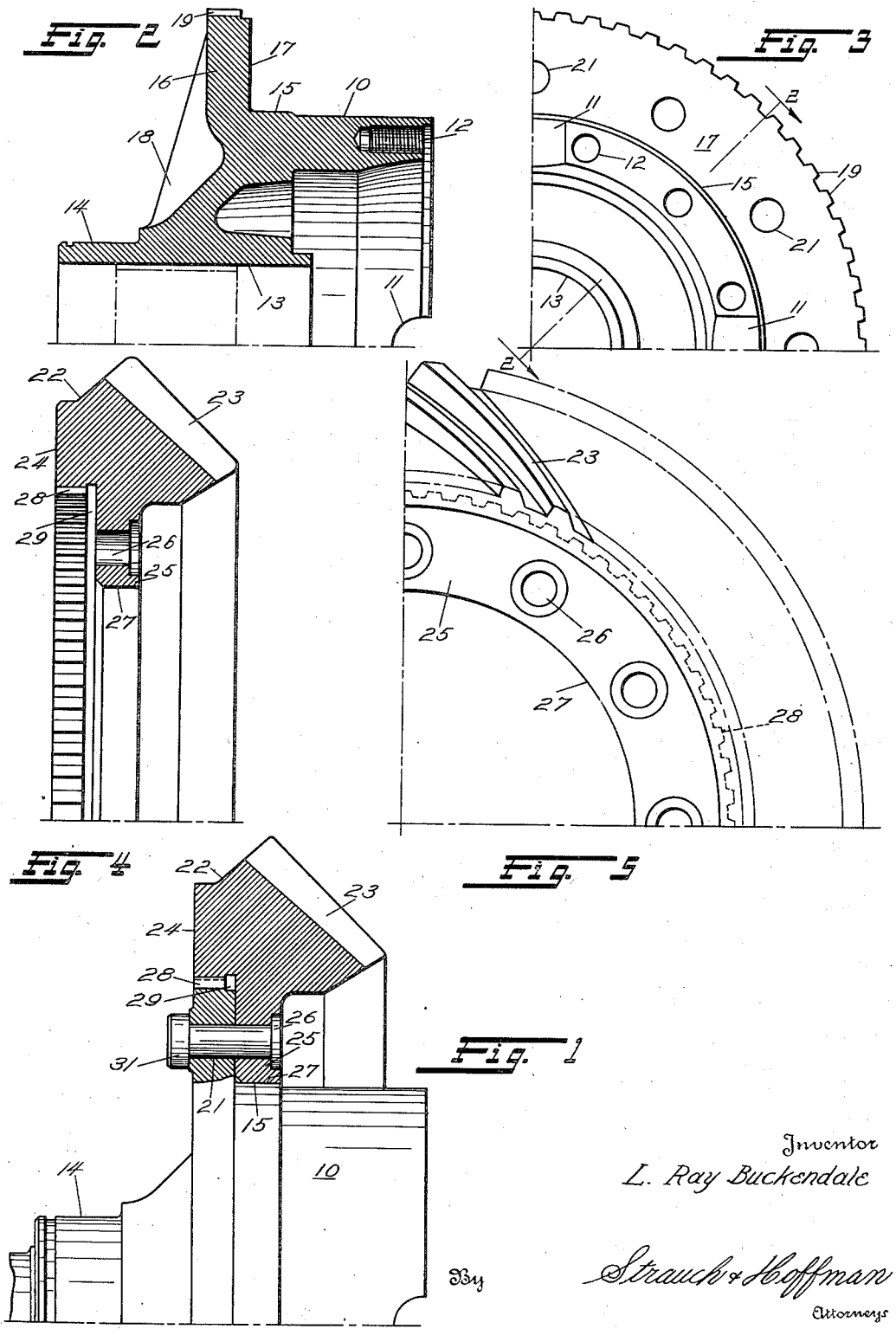

2,189,100

UNITED STATES PATENT OFFICE 2,189,100

GEAR MOUNTING

Lawrence Ray Buckendale, Detroit, Mich., assignor to The Timken-Detroit Axle Company, Detroit, Mich., a corporation of Ohio Application August 6, 1936, Serial No. 94,685

2 Claims. (Cl. 287—52.05)

This invention relates to gear mountings and it is more particularly concerned with the mounting of bevel gears in the drive axle assemblies of automotive vehicles, although it is not limited to such use.

The most common method of attaching a gear to its mounting member at the present time is what may be termed the "rivet mounting". This consists of press-fitting the gear onto a pilot surface of the mounting member with its back surface abutting a flange formed on the mounting member. A series of aligned rivet holes are located in the gear and the flange. The rivets may be heated before insertion but are usually inserted "cold" and when they are headed over they expand or "swell" in their mid-section and substantially completely fill their apertures.

This mounting is satisfactory in some respects but it possesses several disadvantages which the present invention is designed to overcome.

With the production methods now in use it is practically impossible to provide a series of openings in the gear that will precisely register with a series of openings in the flange, with the result that in some instances the entire gear driving torque is taken by one or two rivets, and failure of the mounting ensues.

In an effort to overcome this defect of the above discussed old type of gear mounting it has been proposed to provide the gear and mounting member with intermeshing splines, in order to relieve the rivets of at least some of the torque load. The spline mounting represents a considerable advance over the plain rivet mounting but it is not completely satisfactory because the distance of the splines from the axis is so small that the splines often fail in service.

Another factor which has militated against the success of certain spline mountings heretofore proposed resides in the fact that the rivets are located a greater distance from the axis than the splines, with the result that a given amount of looseness in the splines is reflected as a greater amount of looseness at the rivets, which naturally imposes the torque load upon the rivets and defeats the primary objective of the spline mounting.

My invention aims to provide a spline mounting that overcomes all of the disadvantages inherent in the rivet and spline mountings heretofore proposed. Accordingly, the primary object is to provide a novel gear mounting which will rigidly maintain the gear in proper assembled position at all times, which will positively eliminate backlash and which will reenforce the gear against distortion in response to the abnormally high pressures or thrusts encountered in severe service.

Another important object is to provide a gear mounting embodying a piloting surface for maintaining concentricity of the gear and a plurality of splines of considerable size and disposed a comparatively great distance from the gear axis to adequately transmit the torque load from the gear to the mounting.

A further object is to provide a gear mounting embodying a piloting surface for maintaining concentricity of the gear and a set of closely intermeshing splines located opposite the tooth pressure center of the gear and disposed a considerable distance from the axis so that the splines function as a secondary assisting piloting surface and also adequately transmit the torque of the load between the gear and the mounting without backlash.

Another object is to provide a gear mounting having a continuous spline connection located outwardly of the rivets or screws which secure the parts together, thereby insuring all of the torque load will be taken by the splines.

There have recently gone into use vehicles of the rear motored type. In some of these vehicles the motor is located rearwardly of the rear axle and is coupled to the rear axle by means of a comparatively short propeller shaft which is disposed at an acute angle with respect to the rear axle. This necessitates locating the drive pinion at an acute angle with respect to the axis of the ring gear and it has been found that the ring gear is subjected to forces that render conventional mountings incapable of securely maintaining the gear in place.

It is accordingly a further object of the invention to provide a mounting assembly for securely holding the ring gear in place which is particularly valuable in a gear organization of the character wherein the axes of the pinion and ring gear are disposed at an acute angle with respect to each other.

Further objects will become apparent as the specification proceeds in connection with the annexed drawings, and from the appended claims.

In the drawings:

Figure 1 is a side elevational view of a gear mounting embodying the invention, and the gear and flange are shown in section to more clearly illustrate the construction.

Figure 2 is a fragmental longitudinal sectional view of the mounting member employed in the device of Figure 1, and is taken substantially along the line 2—2 of Figure 3.

Figure 3 is an end elevational view of the mounting member shown in Figure 2 as it appears when viewed from the right-hand side of that figure.

Figure 4 is a fragmental longitudinal sectional view of the gear shown in Figure 1.

Figure 5 is an end elevational view of the gear of Figure 4 as it appears when viewed from the right-hand side of that figure.

Figure 6:
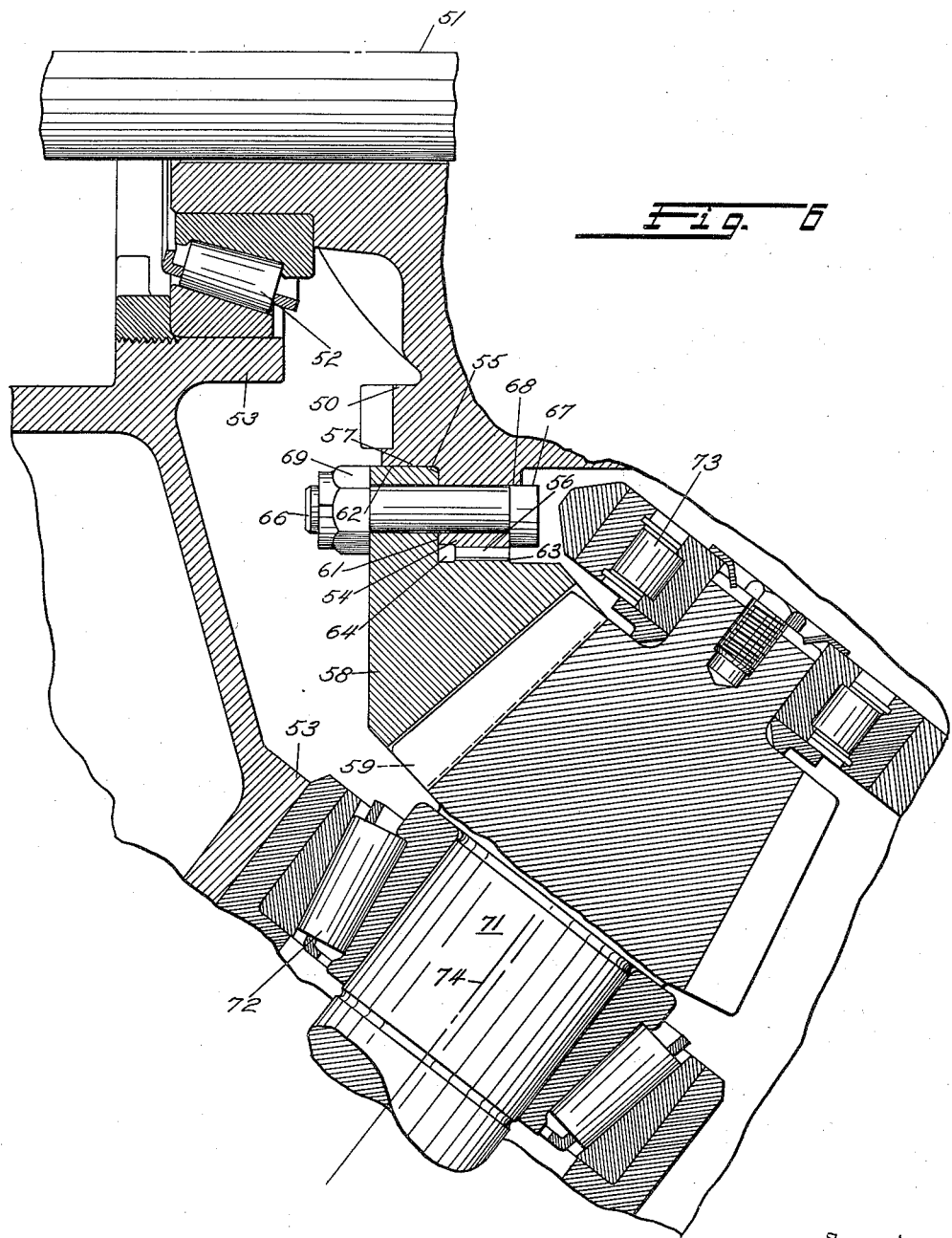
Figure 6 is a longitudinal sectional view of a modified form of gear mounting also forming part of the invention and illustrates the ring gear and pinion, in cooperative meshing relationship.

With continued reference to the drawings, wherein like reference characters have been employed to designate like parts throughout the several views thereof, the gear supporting member 10 of the invention is illustrated as constituting one section of a differential casing for the driving axle of an automotive vehicle, but it is to be understood that the mounting member is not limited to this form.

Mounting member 10 is journaled for rotation in well known manner (not shown) and is provided with a plurality of semi-cylindrical recesses 11 in which the diffierential spider may be mounted; a plurality of tapped recesses 12 for receiving the ends of cap screws which hold the other differential casing section (not shown) in place; a cylindrical portion 13 through which one of the driving axles may extend; and an outwardly facing cylindrical surface 14 upon which one of the supporting bearings may be mounted.

The mounting member is also provided with an accurately formed cylindrical piloting surface 15 of predetermined diameter and a radially disposed flange 16 having a backing surface 17. Flange 16 is reenforced against distortion in response to gear thrust forces by a plurality of integrally formed webs 18. The periphery of flange 16 is provided with accurately formed splines 19, which are preferably of involute form and terminate short of surface 17 for a purpose that will presently appear. Flange 16 is also provided with a plurality of preferably symmetrically located openings 21 for accommodating the rivets or other gear securing means.

The bevel gear 22, to which the invention has been applied, is provided with the usual bevel teeth 23 and a smooth back surface 24. The gear is provided with a flange 25 having a plurality of openings 26 therein which are preferably counterbored to accommodate the rivet heads. Openings 26 are formed so as to register as closely as possible with openings 21 of mounting member 10.

Flange 25 terminates in an accurately formed inwardly facing pilot surface 27 which cooperates with pilot surface 15 of member 10. Formed in gear 22 adjacent flange 25 are a plurality of inwardly facing splines 28 which are preferably of involute form and are so dimensioned as to closely interlock with splines 19 of the mounting member when the parts are assembled.

Before splines 28 are formed a groove 29 is preferably formed in the gear so the splines may be cut to full depth throughout their length. Groove 29 also provides an annular pocket into which any burrs, which may be pushed up from the splines when the parts are assembled, may be deposited. Otherwise, small bits of metal might get between the flanges on the gear and mounting and prevent the two parts from being brought into full surface engagement.

The gear is assembled on the mounting member by forcing it axially over the piloting surfaces and splines into the position shown in Figure 1. A plurality of rivets 31 are then introduced into openings 21 and 26 of the mounting and gear and headed over so as to bring the back surface of the gear into engagement with backing surface 17 of the mounting member. Rivets 31 preferably fit openings 21 and 26 tightly. When the parts have been assembled the piloting surfaces fit snugly without lost motion so that they restrain gear 22 against radial movement with respect to the mounting and thereby maintain the parts concentric at all times.

The splines also fit tightly with the result that in addition to relieving the rivets of load by taking all of the torque load between the gear and the mounting, they also function as secondary piloting surfaces and assist in restraining gear 22 against radial movement with respect to the mounting.

For instance, when gear 22 is driven by a bevel pinion and is transmitting power thrust forces of considerable magnitude are developed in the gear and they may be resolved into axial components and radial components. The axial components are absorbed by backing surface 17 which restrains the gear against deforming in an axial direction. The radial component may be divided into two parts, one is absorbed by piloting surface 15 and the other is absorbed by the splines which fit tightly and constitute secondary piloting surfaces.

Splines 19 and 28 are particularly well adapted to perform this function as they are located opposite the tooth pressure centre of the gear, i. e., they are so located that they will be intersected by lines drawn normal to the bevel gear teeth 23 at points approximately midway between the tooth ends.

Splines 19, by reason of their location at the periphery of flange 16, possesses several advantages. In the first place they are located a maximum distance from the axis of the mounting and possess torque arms of maximum length, with the result that for splines of a given size the shearing stresses exerted upon the spline teeth are of a minimum value.

By locating the splines a greater distance from the axis a greater number of splines may be used and they may also be made of greater circumferential thickness to more readily resist the shearing stresses to which they are subjected in service.

Also the splines are located outwardly of the rivets, with the result that should any lost motion develop between the splines they will permit considerably less angular movement between the gear and the mounting than they would if they were disposed inwardly of the rivet connection. This feature insures that any lost motion in the splines will not result in placing the rivets under load, the latter being designed to simply lock the parts together in an axial direction and not to transmit torque. Another advantage of locating the splines on the periphery of the flange resides in the fact that they may be hobbed rather than shaped, which cuts production costs.

By way of simplifying the disclosure as to the clearances provided between the various parts it might be pointed out that theoretically the pilot surfaces and the splines would be perfect circles. If it were possible to achieve this in practice the best procedure would be to have only a very slight tolerance on the piloting surfaces and a drive fit on the splines in order that they might carry all the torque.

Because of machining errors the next best practice is adopted, namely, to machine the piloting surfaces line in line about .004 of an inch loose. In machining the piloting surfaces and in forming the splines, slight errors are found to enter almost always, with the result that the parts may have a line in line fit on one side of the periphery of the piloting surfaces and a necessarily looser fit on the other side. In this way, while the splines have a force fit and tightly interlock, they do not at any time have to be driven or jammed together.

Involute splines are of particular value in my gear mounting as it is possible to make them fit very closely and yet not so tightly as to require a "drive fit." This is possible by reason of the tapered surfaces of the teeth which when forced together exert a wedging action upon each other.

I have accordingly provided a gear mounting which overcomes all of the disadvantages of the prior art and rigidly holds the gear in place in concentric relationship to its mounting without any backlash whatever, and is so designed as to offer considerable support for the gear, thus adequately resisting distorting tendencies set up in the gear during operation.

Although I have described rivets 31 as having a tight fit in openings 21 and 26, it is to be understood that if desired openings 21 or 26 may be made oversize, so as to provide some degree of lost motion radially between one of the members and the rivets or screws or other fastening means because the splines transmit the entire torque load. The appended claims are intended to embrace my invention when it assumes this form.

In Figure 6 I have shown another form of gear mounting embodied in a gear assembly of a particular character as it is particularly equipped to resist the forces developed during operation thereof, but it is to be understood that it is not limited to such use and the appended claims are intended to embrace the invention in any use to which it may be put.

With continued reference to this figure, a gear carrier 50 is mounted for rotation about an axis 51 by means of bearing assemblies 52 which are supported in a casing 53. The carrier or gear supporting member is provided with a radial flange 54 having a clamping surface 55 and the flange is provided on its periphery with a plurality of involute splines 56, as in the first form of my invention. Located adjacent flange 54 is a cylindrical piloting surface 57.

Surrounding supporting member 50 is a bevel ring gear 58 having bevel teeth 59; a backing surface 61; a pilot surface 62; and a plurality of involute splines 63, which are spaced from the gear flange by an annular groove 64.

Gear 58 is assembled with mounting member 50 with their complemental parts in contact in the same manner as the gear of the first form of the invention and with approximately the same clearances. The gear may be held in place by any suitable means, as for instance, a plurality of bolts 66 which pass through aligned apertures in the gear and mounting member. The heads of bolts 66 are each provided with a flat side 67 which cooperates with an abutment surface 68 on member 50 to restrain the bolts against rotation when the parts are pulled home by nuts 69.

The ring gear meshes with a drive pinion 71 which is mounted for rotation in bearings 72 and 73 carried by casing 53, and as seen in Figure 6 the axis of rotation 74 of the pinion is disposed at an acute angle with respect to the axis of the pinion. The specific construction of the carrier, the bearing assemblies and the casing will constitute the subject of a separate application and they will, therefore, not be described in greater detail herein.

It is accordingly seen that the relationship of the backing surface and the piloting surface are reversed with respect to the corresponding parts of the gear mounting shown in Figures 1 to 5 inclusive, and it has been found that this assembly is peculiarly adapted to resist the thrust forces set up in the gear assembly shown in Figure 6. For instance, the axial component of the gear thrust is resisted by backing surface 61, whereas the radial component is absorbed by piloting surface 57. Also, splines 56 and 63 constitute secondary piloting surfaces for restraining the gear against radial movement with respect to its mounting member, in a manner similar to that described in connection with the first form of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gear mounting, a gear supporting member having a radially extending flange, said flange being provided on one side with a backing surface and having a plurality of spline teeth on its periphery, said member also having a portion providing a smooth, substantially cylindrical, outwardly facing piloting surface axially offset to one side of said flange and adjacent to said backing surface, said piloting surface having a diameter which is materially smaller than that of the periphery of said flange; a bevel gear having outwardly facing bevel teeth and an inwardly projecting radial flange seated against said backing surface and provided at its inner edge with a cylindrical surface closely fitting over the piloting surface of said member; a plurality of aligned apertures in said gear flange and said supporting member flange arranged inwardly a substantial distance from the periphery of said supporting member flange; and securing means extending through, and snugly fitting in, said apertures; said gear being also provided with a plurality of internal spline teeth interlocked with the spline teeth on the periphery of said supporting member flange, said interlocked spline teeth closely interfitting in substantially a force fit, whereby, said interlocked spline teeth function as secondary piloting surfaces to assist in supporting said gear against radial loads and assume all torque stress in said mounting.

2. In a gear mounting, a gear supporting member having a radially extending flange, said flange being provided on one side with a backing surface and having a plurality of spline teeth on its periphery, said member also having a portion providing a smooth, substantially cylindrical, outwardly facing piloting surface axially offset to one side of said flange and adjacent to said backing surface, said piloting surface having a diameter which is materially smaller than that of the periphery of said flange; a bevel gear having bevel teeth facing outwardly and away from said backing surface and an inwardly projecting radial flange seated on said backing surface and provided at its inner edge with a cylindrical surface closely fitting over said piloting surface of said member; a plurality of aligned apertures in said gear flange and said supporting member flange arranged inwardly a substantial distance from the periphery of said supporting member flange; and securing means extending through, and snugly fitting in, said apertures; said gear being also provided with a plurality of internal spline teeth interlocked with the spline teeth on the periphery of said flange, said interlocked spline teeth being located opposite the pressure center of said bevel teeth, that is, so that they are intersected by lines drawn normal to, and intersecting said bevel teeth at points located approximately midway between the ends of the latter, and closely interfitting in substantially a force fit; whereby said interlocked spline teeth function as secondary piloting surfaces to assist in supporting said gear against radial loads, back up said bevel gear opposite its center of pressure, and assume all torque stress in said mounting.

LAWRENCE RAY BUCKENDALE.